(12) United States Patent
Zhang et al.

(10) Patent No.: US 11,113,507 B2
(45) Date of Patent: Sep. 7, 2021

(54) SYSTEM AND METHOD FOR FAST OBJECT DETECTION

(71) Applicant: Samsung Electronics Co., Ltd., Suwon-si (KR)

(72) Inventors: Heming Zhang, Los Angeles, CA (US); Xiaolong Wang, Sunnyvale, CA (US); Jingwen Zhu, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 15/986,689

(22) Filed: May 22, 2018

(65) Prior Publication Data

US 2019/0362132 A1   Nov. 28, 2019

(51) Int. Cl.
  *G06K 9/00*   (2006.01)
  *G06K 9/46*   (2006.01)
  *H04N 5/232*   (2006.01)
  *G06K 9/62*   (2006.01)

(52) U.S. Cl.
  CPC ..... *G06K 9/00248* (2013.01); *G06K 9/00281* (2013.01); *G06K 9/4671* (2013.01); *G06K 9/628* (2013.01); *H04N 5/23219* (2013.01)

(58) Field of Classification Search
  CPC ........... G06K 9/00248; G06K 9/00281; G06K 9/4671; G06K 9/628; G06K 9/00288; H04N 5/23219
  See application file for complete search history.

(56) References Cited

U.S. PATENT DOCUMENTS

| 8,542,885 B2 | 9/2013 | Abe |
| 2007/0201725 A1* | 8/2007 | Steinberg ........... G06K 9/00228 382/103 |
| 2009/0079860 A1 | 3/2009 | Li |
| 2011/0242363 A1 | 10/2011 | Nozaki et al. |
| 2014/0078173 A1 | 3/2014 | Takano et al. |
| 2015/0098000 A1 | 4/2015 | Gosangi et al. |
| 2015/0229838 A1 | 8/2015 | Hakim et al. |
| 2016/0127641 A1 | 5/2016 | Gove |

(Continued)

FOREIGN PATENT DOCUMENTS

| EP | 1128316 A1 | 8/2001 |
| KR | 2010-0024261 A | 3/2010 |

OTHER PUBLICATIONS

Ren, Zhixiang, et al. "Region-based saliency detection and its application in object recognition." IEEE Transactions on Circuits and Systems for Video Technology 24.5 (2013): 769-779. (Year: 2013).*

(Continued)

*Primary Examiner* — Jingge Wu
(74) *Attorney, Agent, or Firm* — Sherman IP LLP; Kenneth L. Sherman; Hemavathy Perumal

(57) ABSTRACT

One embodiment provides a method comprising identifying a salient part of an object in an input image based on processing of a region of interest (RoI) in the input image at an electronic device. The method further comprises determining an estimated full appearance of the object in the input image based on the salient part and a relationship between the salient part and the object. The electronic device is operated based on the estimated full appearance of the object.

18 Claims, 12 Drawing Sheets

(56) References Cited

U.S. PATENT DOCUMENTS

2016/0148080 A1     5/2016    Yoo et al.
2017/0374246 A1    12/2017   Wang et al.

OTHER PUBLICATIONS

Zhao, Kaili, Wen-Sheng Chu, and Honggang Zhang. "Deep region and multi-label learning for facial action unit detection." Proceedings of the IEEE Conference on Computer Vision and Pattern Recognition. 2016. (Year: 2016).*

Zhuang, Ni, et al. "Multi-label learning based deep transfer neural network for facial attribute classification." Pattern Recognition 80 (2018): 225-240. (Year: 2018).*

Chen, Tianshui, et al. "Recurrent attentional reinforcement learning for multi-label image recognition." Proceedings of the AAAI Conference on Artificial Intelligence. vol. 32. No. 1. 2018. (Year: 2018).*

Deng, J. et al., "Nested Shallow CNN-Cascade for Face Detection in the Wild," 12th IEEE International Conference on Automatic Face & Gesture Recognition, May 2017, pp. 165-172, IEEE, United States {Abstract Only}.

Wang, L. et al., "A Coupled Encoder-Decoder Network for Joint Face Detection and Landmark Localization," Automatic Face & Gesture Recognition, May 2017, pp. 251-257, IEEE, United States {Abstract Only}.

Li, W. et al., Li, Wei, et al. "Eac-net: A region-based deep enhancing and cropping approach for facial action unit detection." 12th IEEE International Conference on Automatic Face & Gesture Recognition (FG 2017), May 30, 2017, pp. 103-110, IEEE, United States.

International Search Report and Written Opinion dated Aug. 29, 2019 for International Application PCT/KR2019/006126 from National Intellectual Property Administration, pp. 1-8, Korea.

Yang, S. et al., "Faceness-Net: Face Detection through Deep Facial Part Responses", IEEE Transactions on Pattern Analysis and Machine Intelligence, Aug. 10, 2017, vol. 40, No. 8, pp. 1845-1859, IEEE, United States.

Li, H. et al., "A convolutional neural network cascade for face detection", 2015 IEEE Conference on Computer Vision and Pattern Recognition (CVPR), Jun. 7, 2015, pp. 5325-5334, IEEE, United States.

Delakis, M. et al., "Convolutional Face Finder: A Neural Architecture for Fast and Robust Face Detection", IEEE Transactions on Pattern Analysis and Machine Intelligence, Nov. 1, 2004, vol. 26, No. 11, pp. 1408-1423, IEEE, United States.

Extended European Search Report dated Mar. 22, 2021 for European Application No. 19807489.0 from European Patent Office, pp. 1-10, Munich, Germany.

\* cited by examiner

SYSTEM AND METHOD FOR FAST OBJECT DETECTION

TECHNICAL FIELD

One or more embodiments relate generally to object detection, and in particular, a system and method for fast object detection.

BACKGROUND

Object detection generally refers to a process of detecting one or more objects in digital image data. Due to resource constraints (e.g., memory and computation constraints) of mobile electronic devices, real-time object detection on mobile electronic devices is challenging.

SUMMARY

One embodiment provides a method comprising identifying a salient part of an object in an input image based on processing of a region of interest (RoI) in the input image at an electronic device. The method further comprises determining an estimated full appearance of the object in the input image based on the salient part and a relationship between the salient part and the object. The electronic device is operated based on the estimated full appearance of the object.

These and other features, aspects and advantages of the one or more embodiments will become understood with reference to the following description, appended claims and accompanying figures.

DETAILED DESCRIPTION

Figure 1:
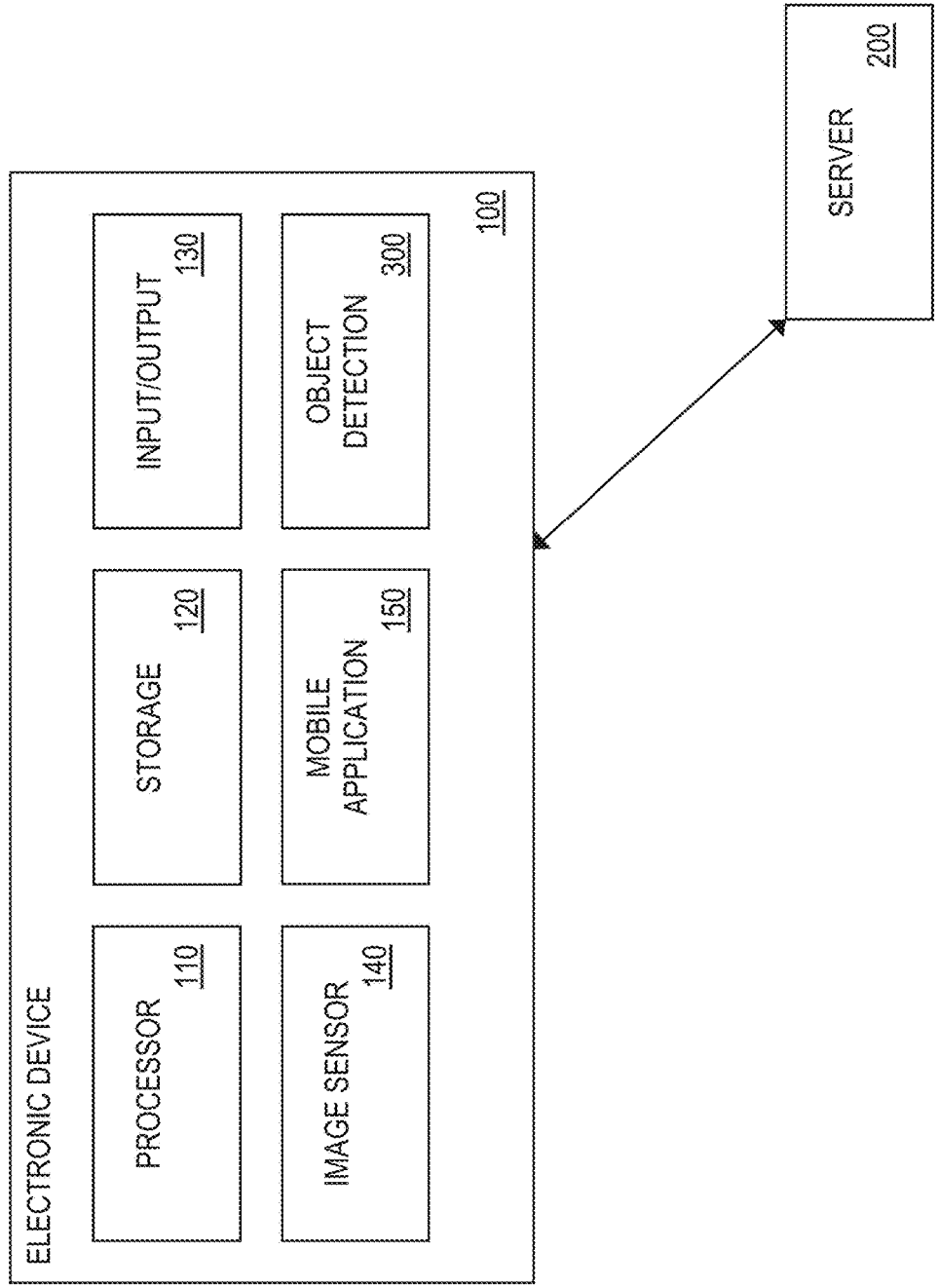
FIG. 1 illustrates an example computing architecture for implementing an object detection system, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to object detection, and in particular, a system and method for fast object detection. One embodiment provides a method comprising identifying a salient part of an object in an input image based on processing of a region of interest (RoI) in the input image at an electronic device. The method further comprises determining an estimated full appearance of the object in the input image based on the salient part and a relationship between the salient part and the object. The electronic device is operated based on the estimated full appearance of the object.

In this specification, the term "input image" generally refers to a digital two-dimensional (2D) image, and the term "input patch" generally refers to a portion of a 2D image that is cropped from the 2D image. The 2D image may be an image captured via an image sensor (e.g., a camera of a mobile electronic device), a screen shot or a screen capture (e.g., a screen capture of a video stream on a mobile electronic device), an image downloaded to and stored on a mobile device, etc. An input patch may be cropped from a 2D image using one or more sliding windows or other methods.

In this specification, the term "region of interest" generally refers to a region of an input image containing one or more objects (e.g., a car, a face, etc.).

In this specification, the term "face detection" generally refers to an object detection task for detecting one or more faces present in an input image.

A cascaded convolutional neural network (CNN) is a typical framework for object detection. The cascaded CNN consists of multiple stages, wherein each stage is a CNN-based binary classifier that classifies input patches as either a RoI (e.g., the input patch contains a face) or a non-RoI (i.e., the input patch does not contain a face). From a first stage to a last stage of the cascaded CNN, a CNN utilized at each stage grows deeper and becomes more discriminative to address false positives. For example, in the first stage, an input image is scanned to obtain candidate RoIs (e.g., candidate facial windows). As objects contained in an input image may have different object sizes (i.e., scales), the first stage must address this multi-scale issue by proposing candidate RoIs that possibly contain objects of different object sizes.

One typical approach for addressing this multi-scale issue is utilizing a small-sized CNN at the first stage. However, because of its limited capacity, the small-sized CNN may only work on a limited range of object sizes. As such, only objects of object sizes similar to a size of an input patch may be detected via the small-sized CNN. To detect objects of different object sizes using the small-sized CNN, an input image must be resized (i.e., rescaled) to different scales, resulting in a dense image pyramid with multiple pyramid levels. As each pyramid level of the dense image pyramid is scanned, fixed-size input patches are cropped from each pyramid level, resulting in a slowdown in total runtime (i.e., low speed).

Another typical approach for addressing the multi-scale issue is utilizing a large-sized CNN or a collection of multiple CNNs that are robust against multi-scale variance. Even though this removes the need to resize/rescale an input image, this approach still results in a slow total runtime due to the complicated nature of the CNNs utilized.

The cascaded CNN forwards candidate RoIs from the first stage to a next stage to reduce a number of false positives (i.e., removing candidate RoIs that are not actually RoIs). Most input patches are eliminated by shallower CNNs utilized at earlier stages of the cascaded CNN before remaining input patches reach the last stage.

Due to resource constraints (e.g., memory and computation constraints) of mobile electronic devices, real-time object detection using the cascaded CNN or other conventional methods on mobile electronic devices is challenging (e.g., slow, low accuracy, etc.).

Objects of different object sizes have different characteristics (i.e., cues). For example, objects of smaller object sizes may only have global characteristics (i.e., local characteristics may be missing), whereas objects of larger object sizes may have both global characteristics and local characteristics. Both typical approaches described above detect objects as a whole, thereby focusing only on global characteristics of objects.

One embodiment provides a system and method for fast object detection, which improve efficiency of object detection. One embodiment focuses on both global and local characteristics of objects simultaneously. To capture local characteristics of an object, one embodiment extracts salient parts of the objects. For example, for face detection, the salient facial parts of a face include, but not limited to, eye, nose, whole mouth, left corner of mouth, right corner of mouth, and ear, etc. In one embodiment, a deep-learning based method, such as a multi-label classification network, is trained to learn features of the salient parts extracted (i.e., local characteristics) as well as features of a whole object (i.e., global characteristics). Unlike conventional approaches that classify an input patch as an object or a non-object (i.e., a binary classifier), the exemplary multi-label classification network is trained to classify an input patch as one of the following: a background, an object, or a salient part of an object.

One embodiment increases speed of the deep-learning based method while maintaining high accuracy.

In one embodiment, if a global characteristic of an object in an input patch is captured, it determines that an object size of the object is small and that a location of the object is directly obtained from a location of the input patch. Based on this, the location of the object is determined to be the location of the input patch (i.e., the location of the input patch is a candidate RoI).

In one embodiment, if a local characteristic of an object is captured, it determines that an object size of the object is large and that a location corresponding to the captured local characteristic is a location of a salient part of a whole object. A location of the object is determined based on a location of the input patch and a relationship between a partial object (i.e., the salient part of the whole object) and the whole object.

In one embodiment, object detection of objects of different object sizes is performed in a single inference, thereby reducing number of times an input image must be resized/rescaled and in turn reducing amount/number of pyramid levels included in an image pyramid provided as input to the multi-label classification network, resulting in increased efficiency.

FIG. 1 illustrates an example computing architecture 10 for implementing an object detection system 300, in one or more embodiments. The computing architecture 10 comprises an electronic device 100 including resources, such as one or more processors 110 and one or more storage units 120. One or more applications may execute/operate on the electronic device 100 utilizing the resources of the electronic device 100.

Examples of an electronic device 100 include, but are not limited to, a desktop computer, a mobile electronic device (e.g., a tablet, a smart phone, a laptop, etc.), a consumer product such as a smart television, or any other product utilizing object detection.

In one embodiment, the electronic device 100 comprises an image sensor 140 integrated in or coupled to the electronic device 100, such as a camera. One or more applications on the electronic device 100 may utilize the image sensor 140 to capture an object presented to the image sensor 140 (e.g., a live video capture of the object, a photograph of the object, etc.).

In one embodiment, the applications on the electronic device 100 include, but are not limited to, an object detection system 300 configured to perform at least one of the following: (1) receive an input image (e.g., captured via the image sensor 140, retrieved from storage 120), and (2) perform object detection on the input image to detect presence of one or more objects in the input image. As described in detail later herein, in one embodiment, the object detection system 300 is configured to identify a salient part (e.g., a facial part) of an object (e.g., a face) in an input image based on processing of a RoI in the input image, and determine an estimated full appearance of the object in the input image based on the salient part and a relationship between the salient part and the object. The electronic device 100 may then be operated based on the estimated full appearance of the object.

In one embodiment, the applications on the electronic device 100 may further include one or more software mobile applications 150 loaded onto or downloaded to the electronic device 100, such as a camera application, a social media application, etc. A software mobile application 150 on the electronic device 100 may exchange data with the object detection system 300. For example, a camera application may invoke the object detection system 300 to perform object detection.

In one embodiment, the electronic device 100 may further include one or more additional sensors, such as a microphone, a GPS, or a depth sensor. A sensor of the electronic device 100 may be utilized to capture content and/or sensor-based contextual information. For example, the object detection system 300 and/or a software mobile application 150 may utilize the one or more additional sensors of the electronic device 100 to capture content and/or sensor-based contextual information, such as a microphone for audio data (e.g., voice recordings), a GPS for location data (e.g., location coordinates), or a depth sensor for a shape of an object presented to the image sensor 140.

In one embodiment, the electronic device 100 comprises one or more input/output (I/O) units 130 integrated in or coupled to the electronic device 100, such as a keyboard, a keypad, a touch interface, or a display screen.

In one embodiment, the electronic device 100 is configured to exchange data with one or more remote servers 200 or remote electronic devices over a connection (e.g., a wireless connection such as a WiFi connection or a cellular data connection, a wired connection, or a combination of the two). For example, a remote server 200 may be an online platform for hosting one or more online services (e.g., an online social media service) and/or distributing one or more software mobile applications 150. As another example, the object detection system 300 may be loaded onto or downloaded to the electronic device 100 from a remote server 200 that maintains and distributes updates for the object detection system 300.

In one embodiment, the computing architecture 10 is a centralized computing architecture. In another embodiment, the computing architecture 10 is a distributed computing architecture.

Figure 2:
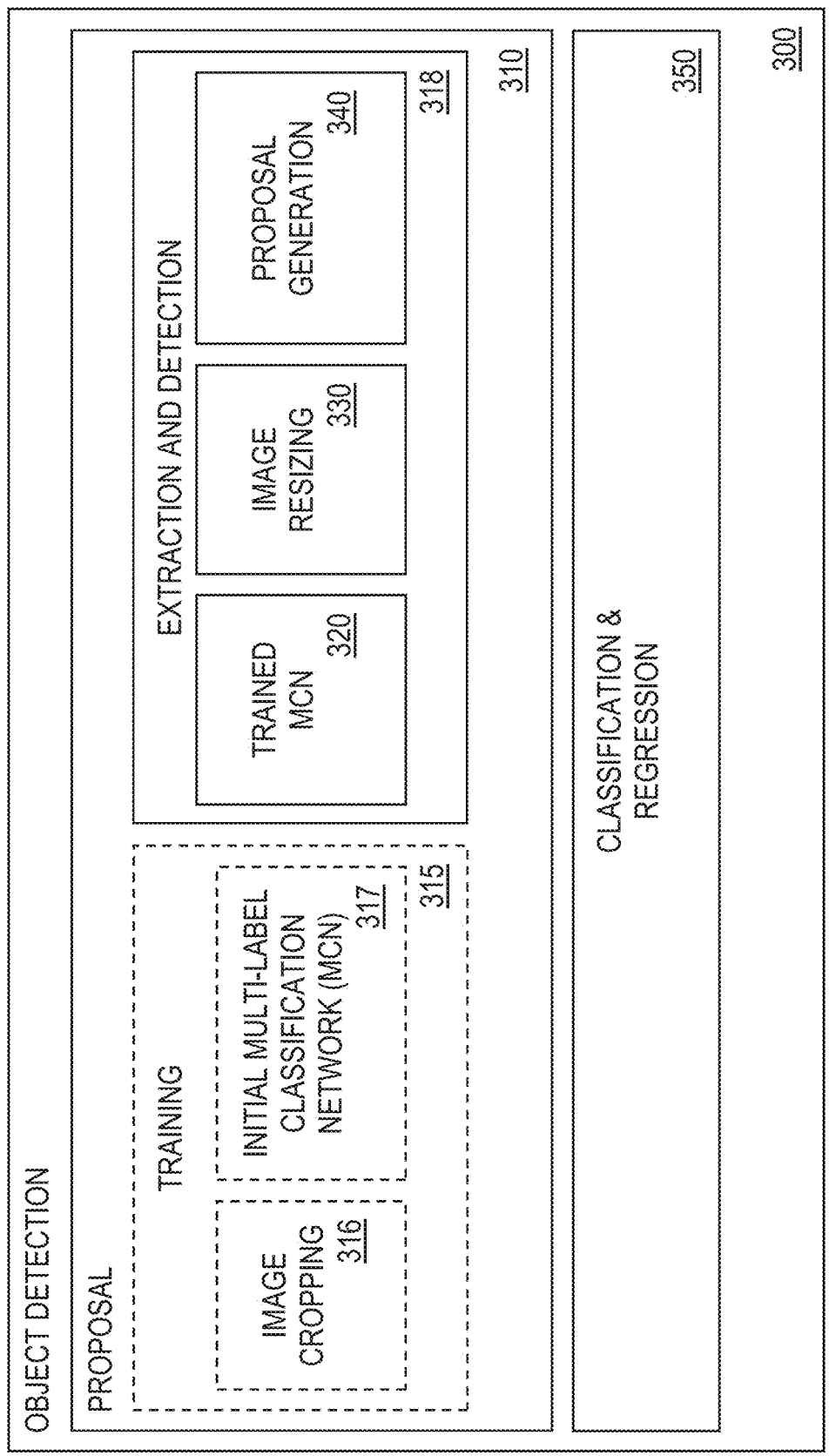
FIG. 2 illustrates an example object detection system in detail, in one or more embodiments.

FIG. 2 illustrates an example object detection system 300 in detail, in one or more embodiments. In one embodiment, the object detection system 300 comprises a proposal system 310 configured to determine one or more candidate RoIs in one or more input images based on a deep-learning based method. As described in detail later herein, in one embodiment, the proposal system 310 utilizes a trained multi-label classification network (MCN) 320 to perform one or more object detection tasks by capturing local characteristics and global characteristics of objects simultaneously.

In one embodiment, the proposal system 310 includes an optional training phase which is associated with an optional training system 315. In one embodiment, during the training phase, the training system 315 is configured to receive a set of input images 50 (FIG. 3) for training ("training images"), and generate a set of input patches 55 by utilizing an image cropping unit 316 to randomly crop the input patches 55 from the training images 50. The training system 315 provides the input patches 55 to an initial MCN 317 for use as training data. During the training phase, the MCN 317 is trained to learn local characteristics as well as global characteristics of objects.

In one embodiment, the training phase may take place offline (i.e., not on the electronic device 100). For example, in one embodiment, the training phase may take place utilizing a remote server 200 or a remote electronic device.

In one embodiment, the proposal system 310 includes an operating phase which is associated with an extraction and detection system 318. In the operating phase, in one embodiment, the extraction and detection system 318 is configured to receive an input image 60 (FIG. 4), and resize/rescale the input image 60 to form a sparse image pyramid 65 (FIG. 4) by utilizing an image resizing unit 330. The extraction and detection system 318 provides the sparse image pyramid 65 to a trained MCN 320 (e.g., a trained MCN 320 resulting from the training system 315). In response to receiving the sparse image pyramid 65, the MCN 320 generates a set of feature maps 70 (FIG. 4), wherein each feature map 70 is a heat map indicative of one or more regions (i.e., locations) in the input image 60 where characteristics associated with a whole object or a salient part of the whole object (e.g., a facial part) are captured by the MCN 320. As described in detail later herein, in one embodiment, for face detection, the MCN 320 generates feature maps indicative of one or more regions in an input image 60 where characteristics associated with a whole face and/or facial parts are captured.

The extraction and detection system 318 forwards the feature maps 70 to a proposal generation system 340. The proposal generation system 340 is configured to generate one or more proposals for the input image 60 based on the feature maps 70 and pre-defined bounding box templates for objects, wherein each proposal is indicative of one or more candidate RoIs in the input image 60. As described in detail later herein, in one embodiment, for face detection, the proposal generation system 340 generates one or more face proposals based on feature maps 70 of faces and/or facial parts and pre-defined bounding box templates for different facial parts.

In one embodiment, the object detection system 300 comprises a classification and regression unit 350. The classification and regression unit 350 is configured to receive one or more proposals from the proposal system 310, classify each proposal as one of a background, a whole object (e.g., a face), or a salient part of a whole object (e.g., a facial part), and regress each proposal containing a whole object or a salient part of a whole object to fit boundaries of the object.

In one embodiment, the operating phase may take place online (i.e., on the electronic device 100).

Figure 3:
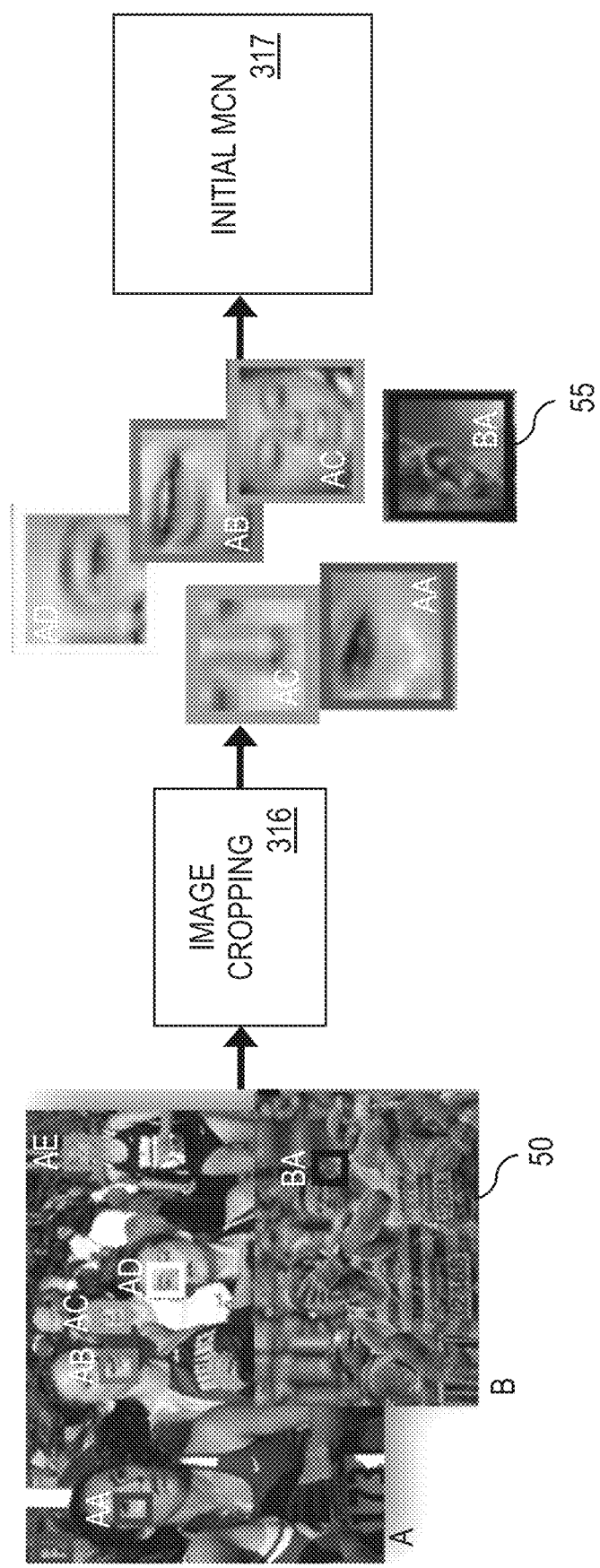
FIG. 3 illustrates an example training phase, in one or more embodiments.

FIG. 3 illustrates an example training phase, in one or more embodiments. In one embodiment, the training phase involves training the initial MCN 317 for face detection. Specifically, the training system 315 receives a set of training images 50 including faces and facial parts. The image cropping unit 316 randomly crops a set of input patches 55 comprising faces and different facial parts (e.g., ear, eye, whole mouth, nose, etc.) from the training images 50. For example, if the training images 50 include an image A showing a first set of runners and a different image B showing a second set of runners, the input patches 55 may include, but are not limited to, one or more of the following: an input patch AA showing an eye cropped from the image A, an input patch AB showing a whole mouth cropped from the image A, an input patch AC showing a nose cropped from the image A, an input patch AD showing a different eye cropped from the image A, and an input patch BA showing an ear cropped from the image B. In one embodiment, the input patches 55 are used in training the initial MCN 317 to classify an input patch 55 as one of the following categories/classifications: (1) background, (2) whole face, (3) eye, (4) nose, (5) whole mouth, (6) left corner of mouth, (7) right corner of mouth, or (8) ear. The MCN 317 is trained to capture global characteristics of a whole face and local characteristics of different facial parts (i.e., eye, nose, whole mouth, left corner of mouth, right corner of mouth, or ear) simultaneously. In another embodiment, the initial MCN 317 may be trained to classify the input patch 55 as categories/classifications different or less/more than the eight categories described above.

In one embodiment, a trained MCN 320 resulting from the training system 315 is fully convolutional. The trained MCN 320 does not require a fixed input size and may receive an input image of arbitrary dimensions. The trained MCN 320 removes the need for cropping out input patches using sliding windows or other methods. In one embodiment, an input resolution of the trained MCN 320 is 12×12, and a stride width is set to 2.

Figure 4:
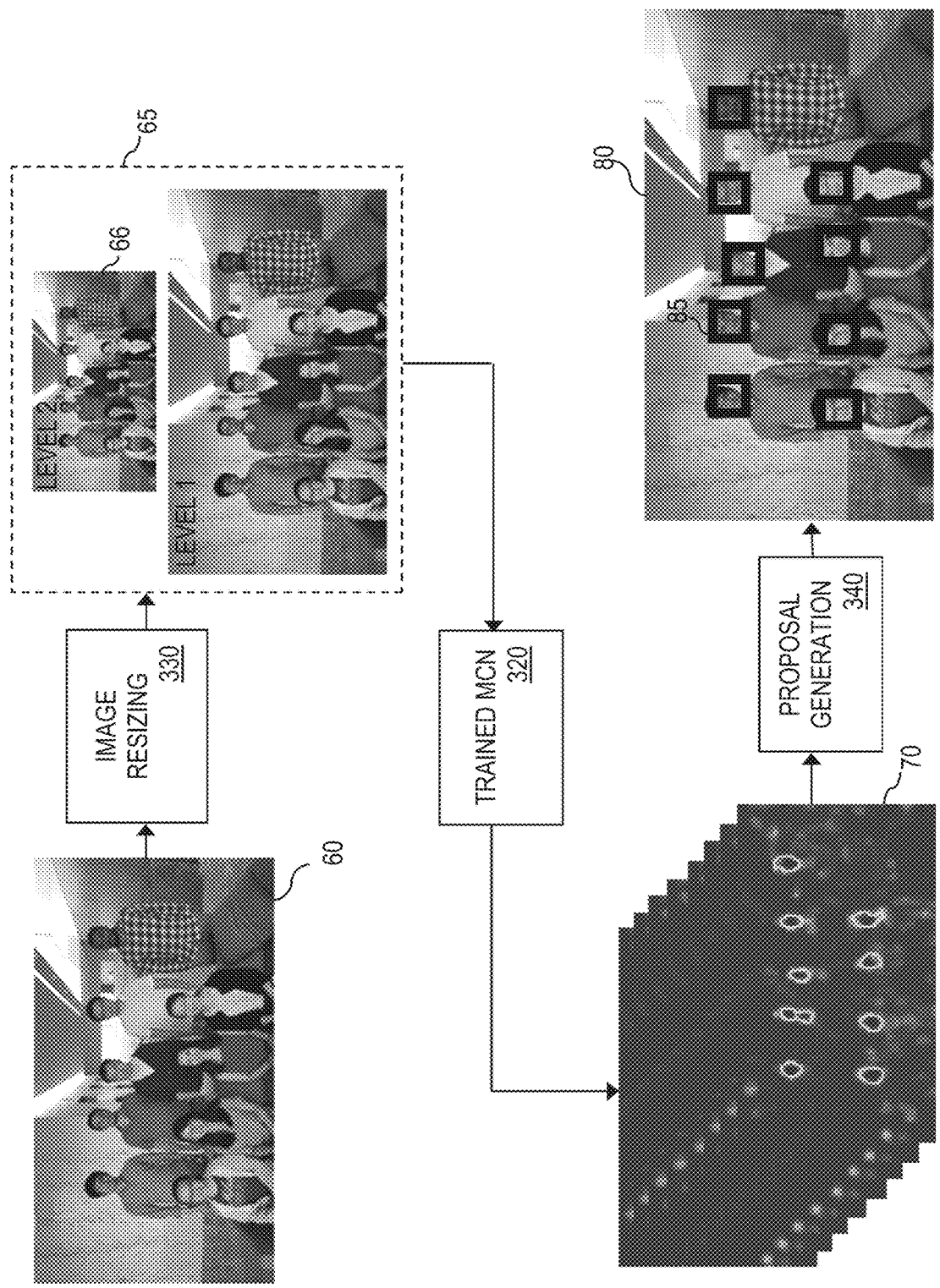
FIG. 4 illustrates an example object detection process, in one or more embodiments.

FIG. 4 illustrates an example object detection process, in one or more embodiments. In one embodiment, the operating phase involves utilizing the trained MCN 320 to perform face detection. Specifically, the extraction and detection system 318 receives an input image 60 in the operating phase. For example, as shown in FIG. 4, the input image 60 may show one or more faces. The image resizing unit 330 resizes the input image 60 to different scales by generating a sparse image pyramid 65 with one or more pyramid levels 66, wherein each pyramid level 66 is encoded with different scales of the input image 60. The sparse image pyramid 65 has fewer pyramid levels 66 than a dense image pyramid generated using the conventional cascaded CNN. Unlike a dense image pyramid where each pyramid level of the dense image pyramid corresponds to one specific scale, each pyramid level 66 of the sparse image pyramid 65 corresponds to multiple scales, thereby reducing an amount/number of pyramid levels 66 required, and increasing a number of proposals generated by the proposal generation system 340 for the input image 60.

For example, as shown in FIG. 4, the sparse image pyramid 65 may include a first pyramid level 66 (LEVEL 1) and a second pyramid level 66 (LEVEL 2).

In response to receiving the sparse image pyramid 65 from the image resizing unit 330, the trained MCN 320 generates a set of feature maps 70 of faces and facial parts. Based on the feature maps 70 received from the MCN 320 and pre-defined bounding box templates for each facial part, the proposal generation system 340 generates one or more face proposals 80. Each face proposal 80 is indicative of one or more candidate facial windows 85, if any, wherein each candidate facial window 85 is a candidate RoI containing a possible face. For example, as shown in FIG. 4, a face proposal 80 may include a candidate facial window 85 for each face shown in the input image 60.

If the MCN 320 captures a global characteristic of a whole face in an input patch, the proposal system 310 determines that a location of the whole face is the location of the input patch (i.e., the location of the input patch is a candidate facial window 85). If the MCN 320 captures a local characteristic of a facial part in an input patch, the proposal system 310 infers a location of a whole face based on a location of the input patch and a relationship between the facial part and the whole face.

Figure 5:
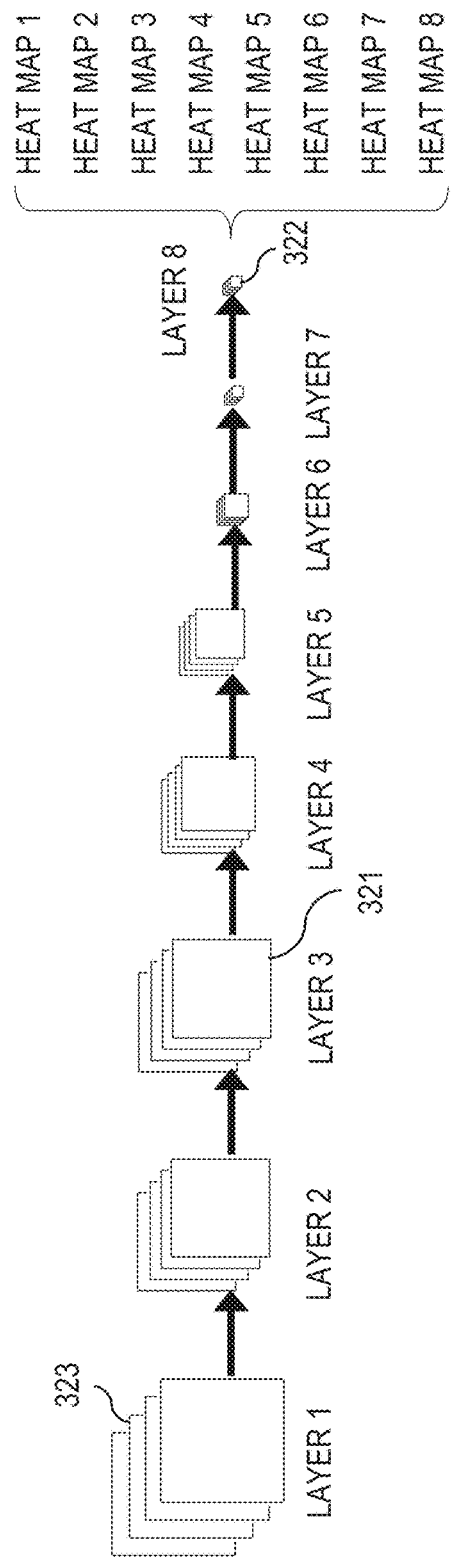
FIG. 5 illustrates an example trained multi-label classification network, in one or more embodiments.

FIG. 5 illustrates an example trained MCN 320, in one or more embodiments. In one embodiment, the MCN 320 is fully convolutional. The MCN 320 does not require a fixed input size and may receive an input image of arbitrary dimensions. The MCN 320 comprises multiple layers 321 (e.g., one or more convolutional layers, one or more pooling layers) including a last layer 322. Each layer 321 comprises a set of receptive fields 323 of a particular size.

For example, as shown in FIG. 5, the MCN 320 may comprise at least the following: (1) a first layer 321 ("LAYER 1") including a first set of receptive fields 323, wherein each receptive field 323 of the first set has a size of 10×10×16, (2) a second layer 321 ("LAYER 2") including a second set of receptive fields 323, wherein each receptive field 323 of the second set has a size of 8×8×16, (3) a third layer 321 ("LAYER 3") including a third set of receptive fields 323, wherein each receptive field 323 of the third set has a size of 8×8×16, (4) a fourth layer 321 ("LAYER 4") including a fourth set of receptive fields 323, wherein each receptive field 323 of the fourth set has a size of 6×6×32, (5) a fifth layer 321 ("LAYER 5") including a fifth set of receptive fields 323, wherein each receptive field 323 of the fifth set has a size of 4×4×32, (6) a sixth layer 321 ("LAYER 6") including a sixth set of receptive fields, wherein each receptive field 323 of the sixth set has a size of 2×2×32, (7) a seventh layer 321 ("LAYER 7") including a seventh set of receptive fields, wherein each receptive field 323 of the seventh set has a size of 1×1×64, and (8) a last layer 322 ("LAYER 8") including an eighth set of receptive fields, wherein each receptive field 323 of the eighth set has a size of 1×1×8.

In one embodiment, the set of receptive fields 323 of the last layer 322 has a total size of m×n×x, wherein m×n is a maximum image resolution of an input image 60 the MCN 320 may receive as input, and x is a number of different categories/classifications the MCN 320 is trained to classify. For example, if the MCN 320 is trained to classify eight different categories/classifications for face detection (e.g., background, whole face, eye, nose, whole mouth, left corner of mouth, right corner of mouth, and ear), each receptive field 323 of the last layer 322 has a size of 1×1×8. If the maximum image resolution is 12×12, the total size of the last layer 322 is 12×12×8.

In one embodiment, for each classification the MCN 320 is trained to classify, the last layer 322 is configured to generate a corresponding feature map 70 indicative of one or more regions in an input image 60 where characteristics associated with the classification are captured by the MCN 320. For example, assume the MCN 320 is trained to classify at least the following eight categories/classifications for face detection: background, whole face, eye, nose, whole mouth, left corner of mouth, right corner of mouth, and ear. In response to receiving an input image 60, the last layer 322 generates at least the following: (1) a first feature map 70 (HEAT MAP 1) indicative of one or more regions in the input image 60 where characteristics associated with a whole face are captured, (2) a second feature map 70 (HEAT MAP 2) indicative of one or more regions in the input image 60 where characteristics associated with an eye are captured, (3) a third feature map 70 (HEAT MAP 3) indicative of one or more regions in the input image 60 where characteristics associated with a nose are captured, (4) a fourth feature map 70 (HEAT MAP 4) indicative of one or more regions in the input image 60 where characteristics associated with a whole mouth are captured, (5) a fifth feature map 70 (HEAT MAP 5) indicative of one or more regions in the input image 60 where characteristics associated with a left corner of a mouth are captured, (6) a sixth feature map 70 (HEAT MAP 6) indicative of one or more regions in the input image 60 where characteristics associated with a right corner of a mouth are captured, (7) a seventh feature map 70 (HEAT MAP 7) indicative of one or more regions in the input image 60 where characteristics associated with an ear are captured, and (8) an eighth feature map 70 (HEAT MAP 8) indicative of one or more regions in the input image 60 where characteristics associated with a background are captured.

In one embodiment, the object detection system 300 is configured to directly identify a salient part of an object when an object size of the object exceeds processing size (e.g., maximum image resolution of the MCN 320).

Figure 6:
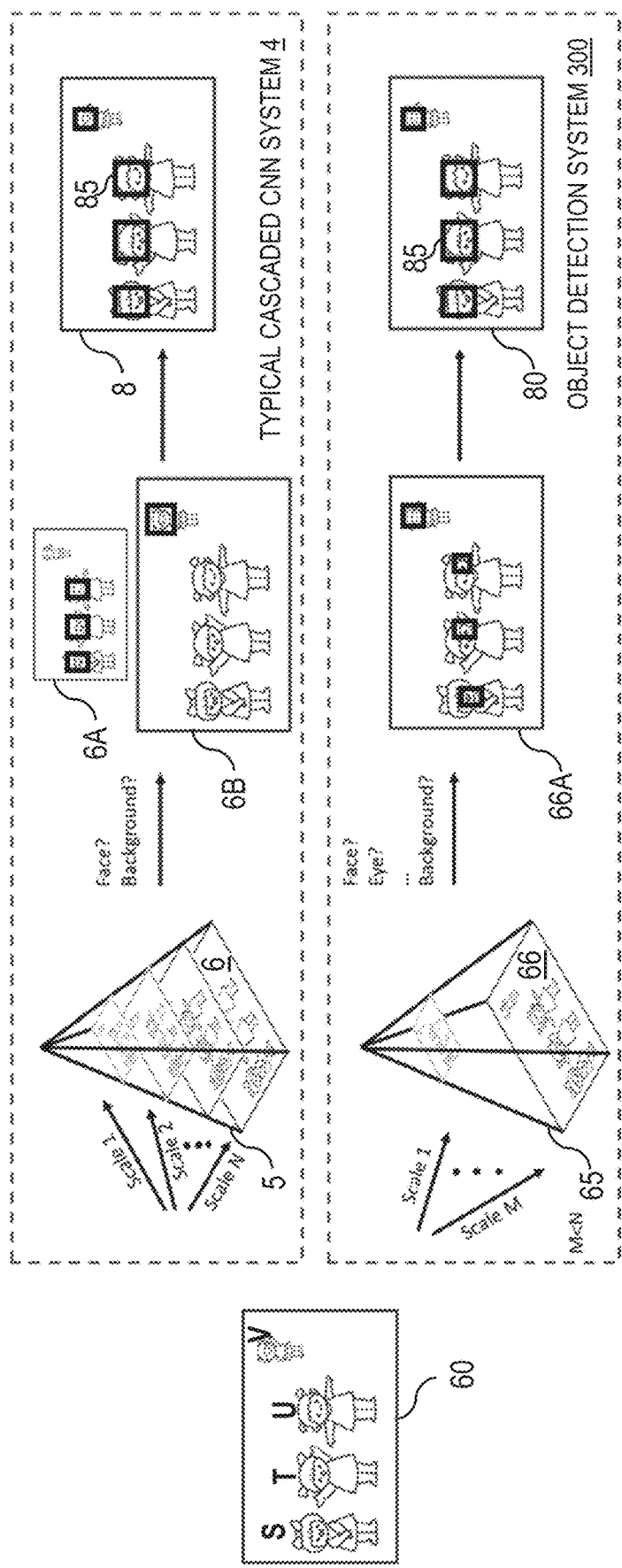
FIG. 6 illustrates a comparison between object detection performed via a typical cascaded convolutional neural network system and object detection performed via the object detection system, in one or more embodiments.

FIG. 6 illustrates a comparison between object detection performed via a conventional cascaded CNN system 4 and object detection performed via the object detection system 300, in one or more embodiments. Assume a same input image 60 is provided to both the conventional cascaded CNN system 4 and the object detection system 300. As shown in FIG. 6, the input image 60 shows different faces at different regions in the input image 60, such as a first face S at a first region, a second face T at a second region, a third face U at a third region, and a fourth face V at a fourth region.

In response to receiving the input image 60, the conventional cascaded CNN system 4 generates a dense image pyramid 5 comprising multiple pyramid levels 6, wherein each pyramid level 6 corresponds to a particular scale of the input image 60. For example, as shown in FIG. 6, the dense image pyramid 5 comprises a first pyramid level 6 corresponding to a first scale (Scale 1) of the input image 60, a second pyramid level 6 corresponding to a second scale (Scale 2) of the input image 60, . . . , and an $N^{th}$ pyramid level 6 corresponding to an $N^{th}$ scale (Scale N) of the input image 60, wherein N is a positive integer. The conventional cascaded CNN system 4 provides the dense image pyramid 5 to a cascaded CNN.

By comparison, in response to receiving the input image 60, the object detection system 300 generates a sparse image pyramid 65 comprising multiple pyramid levels 66, wherein each pyramid level 66 corresponds to different scales of the input image 60. For example, as shown in FIG. 6, the sparse image pyramid 65 comprises a first pyramid level 66 corresponding to a set of different scales including a first scale (Scale 1) of the input image 60, . . . , and an $M^{th}$ pyramid level 66 corresponding to another set of different scales including an $M^{th}$ scale (scale M) of the input image 60, wherein M is a positive integer, and M<N. As each pyramid level 66 of the sparse image pyramid 65 is encoded with multiple scales, the sparse image pyramid 65 requires fewer pyramid levels than the dense image pyramid 5. The object detection system 300 provides the sparse image pyramid 65 to the MCN 320.

For each pyramid level 6 of the dense image pyramid 5, the cascaded CNN classifies each input patch of the pyramid level 6 as either face or background only. For example, as shown in FIG. 6, the cascaded CNN classifies the following: (1) three input patches of a pyramid level 6A of the dense image pyramid 66 as face (i.e., faces S, T and U), and (2) one input patch of a pyramid level 6B of the dense image pyramid 66 as face (i.e., face V). Based on the classifications, the typical cascaded CNN system 4 outputs a face proposal 8 indicative of four candidate facial windows 85 in the input image 60 (i.e., faces S, T, U and V).

By comparison, for each pyramid level 66 of the sparse image pyramid 65, the MCN 320 classifies each input patch of the pyramid level 66 as background only, a whole face, or a particular facial part of a whole face (i.e., eye, nose, whole mouth, left corner of mouth, right corner of mouth, or ear). For example, as shown in FIG. 6, the MCN 320 classifies the following: (1) one input patch of a pyramid level 66A of the sparse image pyramid 66 as mouth (i.e., mouth of face S), (2) two other input patches of the pyramid level 66A as eye (i.e., eye of face T and eye of face U), and (3) another input patch of the pyramid level 66A as face (i.e., face V). The object detection system 300 outputs a face proposal 80 indicative of four candidate facial windows 85 in the input image 60 (i.e., faces S, T, U and V). Therefore, unlike the typical cascaded CNN system 4, the object detection system 300 is more accurate as it is able to detect whole faces and different facial parts.

Figure 7:
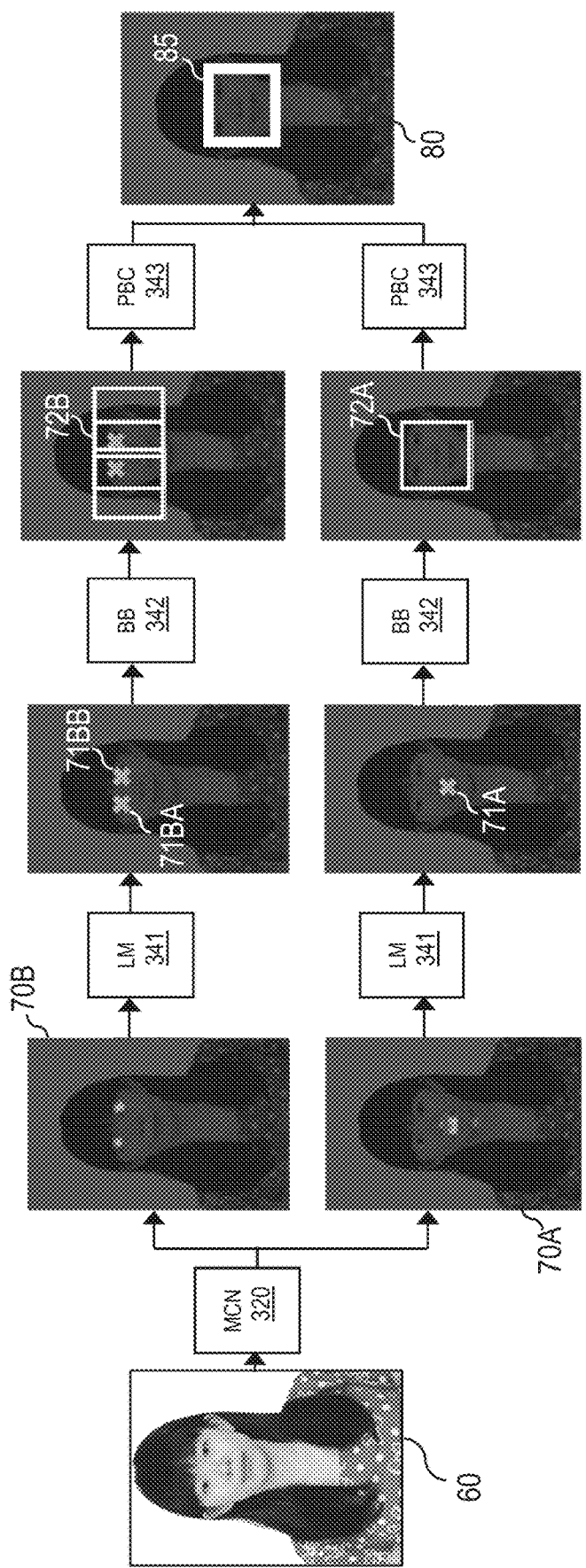
FIG. 7 illustrates an example proposal generation process, in one or more embodiments.

FIG. 7 illustrates an example proposal generation process, in one or more embodiments. In one embodiment, a set of feature maps 70 generated by the MCN 320 in response to receiving an input image 60 is forwarded to the proposal generation system 340. For example, if the MCN 320 is trained for face detection, the set of feature maps 70 may include a first feature map 70A indicating one or more regions in the input image 60 where characteristics associated with a whole mouth are captured by the MCN 320, and a second feature map 70B indicating one or more regions in the input image 60 where characteristics associated with eyes are captured by the MCN 320, as shown in FIG. 7 (feature maps corresponding to background only, whole face or other facial parts are not shown in FIG. 7 for ease of illustration).

In one embodiment, the proposal generation system 340 comprises a local maxima unit 341 configured to, for each feature map 70 corresponding to a facial part, determine a local maxima for the feature map. Let p generally denote a particular facial part, and let $\tau_p$ generally denote a corresponding pre-determined threshold for maintaining a strong response point in a local region of a feature map corresponding to the facial part p. In one embodiment, to determine a local maxima for a feature map 70 corresponding to a facial part p, the local maxima unit 341 applies non-maximum suppression (NMS) to the feature map 70 to obtain one or more strongest response points in one or more local regions of the feature map 70. For example, as shown in FIG. 7, the local maxima unit 341 obtains a strongest response point 71A (corresponding to location of mouth) for the first feature map 70A, and two strongest response points 71BA and 71BB (corresponding to locations of left and right eyes) for the second feature map 70B.

In one embodiment, the proposal generation system 340 comprises a bounding box unit 342 configured to, for each feature map 70 corresponding to a facial part, determine one or more bounding boxes of a face based on a local maxima for the feature map 70 (e.g., local maxima determined by the local maxima unit 341) and one or more bounding box templates for the facial part. For each facial part p, the bounding box unit 342 maintains one or more corresponding bounding box templates. A bounding box template corresponding to a facial part is a pre-defined template region for the facial part. For example, for some facial parts such as eyes, the bounding box unit 342 may maintain two bounding box templates.

Let $b_i$ generally denote a location of a bounding box i, wherein $b_i=(x_{i1},y_{i1},x_{i2},y_{i2})$, $(x_{i1},y_{i1})$ are coordinates of an upper-left vertex of the bounding box i, and $(x_{i2}, y_{i2})$ are coordinates of a bottom-right vertex of the bounding box i. Let $p_i$ generally denote a confidence score for a corresponding bounding box i. In one embodiment, to determine a bounding box of a face based on a local maxima of a feature map 70 corresponding to a facial part p, the bounding box unit 342 sets a corresponding confidence score $p_i$ to be equal to its corresponding value in the feature map 70, wherein the corresponding value is a magnitude of a point on the feature map 70 that corresponds to a location of the bounding box. For example, as shown in FIG. 7, the bounding box unit 342 determines a bounding box 72A for the first feature map 70A, and four separate bounding boxes 72B for the second feature map 70B (two bounding boxes 70B for the left eye, two bounding boxes 70B for the right eye).

In one embodiment, the proposal generation system 340 comprises a part box combination (PBC) unit 343 configured to infer a region containing a face (i.e., a face region or facial window) from regions containing facial parts (i.e., facial part regions). In one embodiment, to obtain a face region, facial part regions that have high overlap are combined by averaging.

Specifically, given an original set of bounding boxes for feature maps 70 corresponding to different facial parts, the PBC unit 343 initiates a searching and merging process by selecting a bounding box with a highest confidence score, and identifying all bounding boxes that have intersection over union (IoU) with the selected bounding box higher than a threshold $\tau_{IoU}$. The PBC unit 343 merges/combines the selected bounding box and the bounding boxes identified into a merged bounding box representing a face region by averaging location coordinates in accordance with equations (1) provided below:

$$b_{m,i} = \frac{1}{|C_i|} \sum_{j \in C_i} b_j, \qquad (1)$$

wherein $C_i$ is a set of highly overlapped bounding boxes, and $C_i$ is defined in accordance with equation (2) provided below:

$$C_i = \{b_i\} \cup \{b_j : IoU(b_i, b_j) > \sigma_{IoU}\} \qquad (2).$$

The PBC unit 343 determines a corresponding confidence score $p_{m,i}$ for the merged bounding box in accordance with equation (3) provided below:

$$p_{m,i} = 1 - \prod_{j \in C_i} (1 - p_j). \quad (3)$$

For example, as shown in FIG. 7, the PBC unit 343 generates a face proposal 80 including a merged bounding box representing a candidate facial window 85, wherein the merged bounding box is based on a set of bounding boxes for feature maps 70 corresponding to different facial parts (e.g., bounding boxes 72A and 72B for feature maps 70A and 70B, respectively). The merged bounding box is assigned to the face proposal 80 and bounding boxes used for merging are eliminated from the original set. The PBC unit 343 repeats the searching and merging process for remaining bounding boxes in the original set until there are no remaining bounding boxes.

Figure 8:
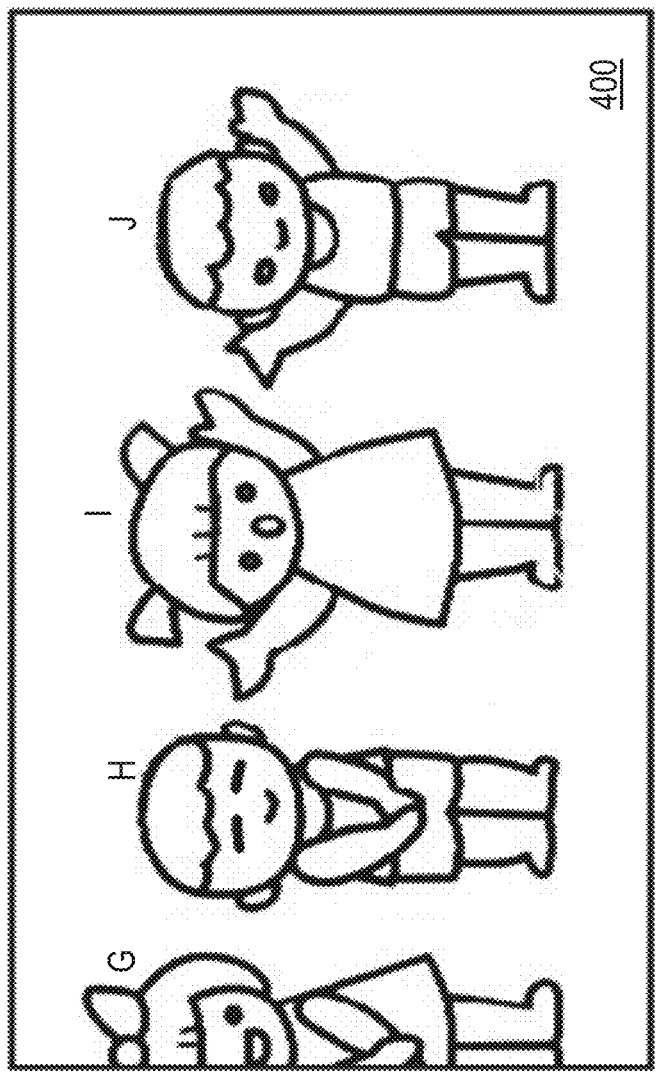
FIG. 8 illustrates an example application of the object detection system, in one or more embodiments.

FIG. 8 illustrates an example application of the object detection system 300, in one or more embodiments. In one embodiment, one or more software mobile applications 150 loaded onto or downloaded to the electronic device 100 may exchange data with the object detection system 300. In one embodiment, a camera application controlling a camera on the electronic device 100 may invoke the object detection system 300 to perform object detection. For example, if a user interacts with a shutter of the camera, the camera application may enable capture of a picture (i.e., photograph) only when the object detection system 300 detects expected features for each subject (e.g., an individual) within a camera view 400 of the camera. Expected features for each subject may include, but are not limited to, the subject having open eyes, a smiling mouth, a complete face (i.e., face not partially obscured/occluded by an object or shade), and not partially outside the camera view. In one embodiment, these expected features may be accurately extracted using additional learning systems such as, but not limited to, open mouth recognition, expression recognition, etc., which may be built via supervised labeled data. For example, as shown in FIG. 8, the camera view 400 may show four different subjects G, H, I and J to be captured. As subject G is partially outside the camera view 400, subject H has closed eyes and subject I has an open mouth, the object detection system 300 detects the expected features for subject J only (i.e., subjects G, H and I do not have the expected features).

If the object detection system 300 detects the expected features for each subject to be captured, the camera application enables capture of a picture; otherwise, the camera application may invoke other actions such as delay closing of the shutter, provide the user with a warning, etc. As size of faces and facial parts may vary with distance between subjects to be captured and the camera, the object detection system 300 enables fast face detection with large scale capability.

Figure 9:
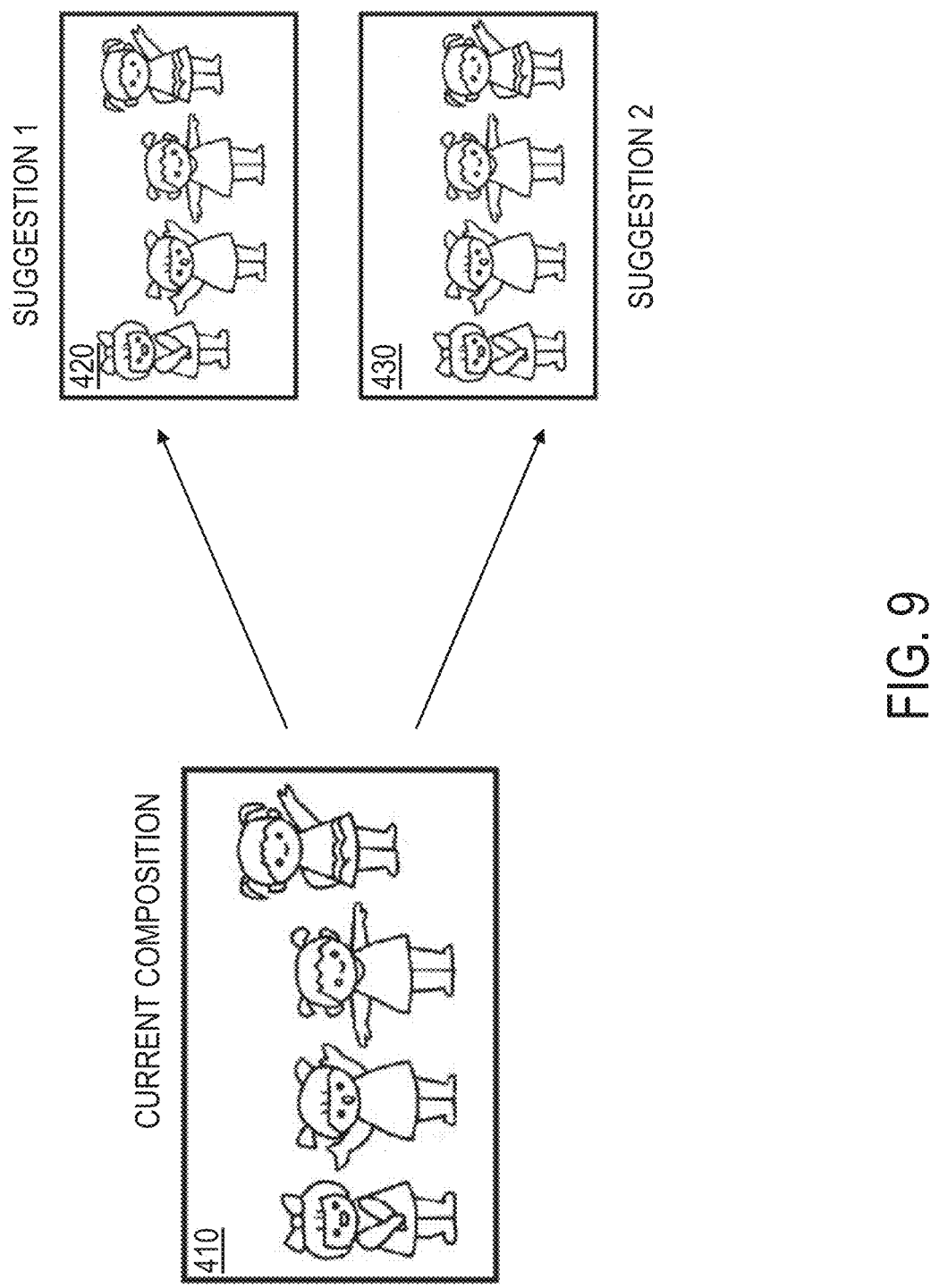
FIG. 9 illustrates another example application of the object detection system, in one or more embodiments.

FIG. 9 illustrates another example application of the object detection system 300, in one or more embodiments. In one embodiment, the camera application may utilize the object detection system 300 to analyze a current composition 410 of a scene within a camera view of the camera, and, based on the current composition 410, provide one or more suggestions to improve a composition of the picture to be taken. The object detection system 300 is configured to determine a bounding box for an object such that boundaries of the bounding box tightly encircle the object. Therefore, if the object detection system 300 determines a bounding box for an object, a location and a size of the object are determined as well. For example, for each subject within the camera view, the object detection system 300 may detect a location of the subject and a size of a face of the subject based on a bounding box determined for the subject.

Based on the information detected, the camera application may suggest one or more actions that require a minimum amount of effort from one or more subjects within the camera view, such as suggesting one subject move to another position, etc. For example, as shown in FIG. 9, the camera application may provide a first suggestion (SUGGESTION 1) that one of the subjects move further back to create an alternative composition 420, and a second suggestion (SUGGESTION 2) that another one of the subjects move further forward to create an alternative composition 430. The suggestions may be presented in various formats, utilizing the electronic device 100, including but not limited to, visual hint, voice notification, etc.

Figure 10:
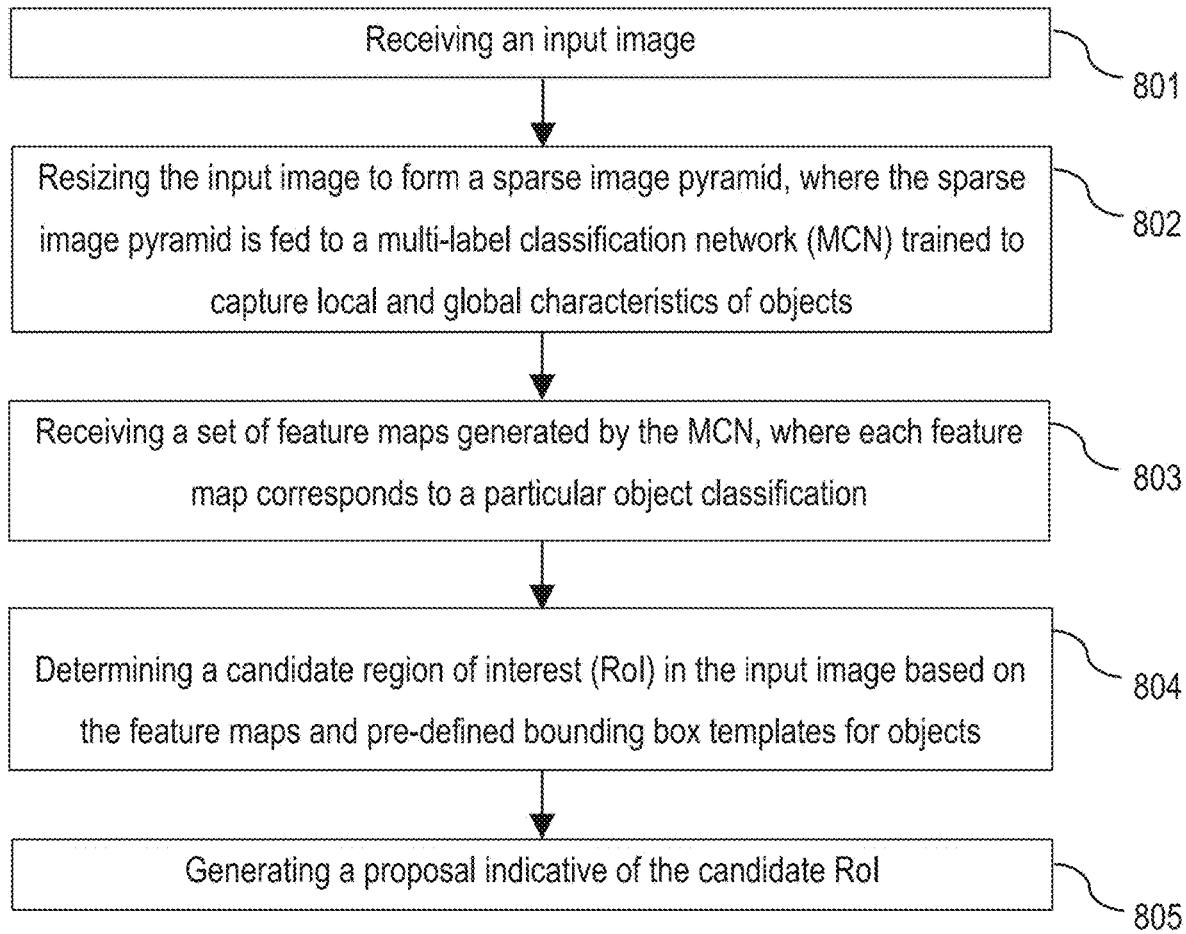
FIG. 10 is a flowchart of an example process for performing fast object detection, in one or more embodiments.

FIG. 10 is a flowchart of an example process 800 for performing fast object detection, in one or more embodiments. Process block 801 includes receiving an input image. Process block 802 includes resizing the input image to different scales to form a sparse image pyramid, where the sparse image pyramid is fed to a multi-label classification network (MCN) trained to capture local and global characteristics of objects. Process block 803 includes receiving a set of feature maps generated by the MCN, wherein each feature map corresponds to a particular object classification (e.g., background, whole object, or salient part). Process block 804 includes determining a candidate RoI in the input image based on the feature maps and pre-defined bounding box templates for objects. Process block 805 includes generating a proposal indicative of the candidate RoI.

In one embodiment, process blocks 801-805 may be performed by one or more components of the object detection system 300, such as the MCN 320, the image resizing unit 330, and the proposal generation system 340.

Figure 11:
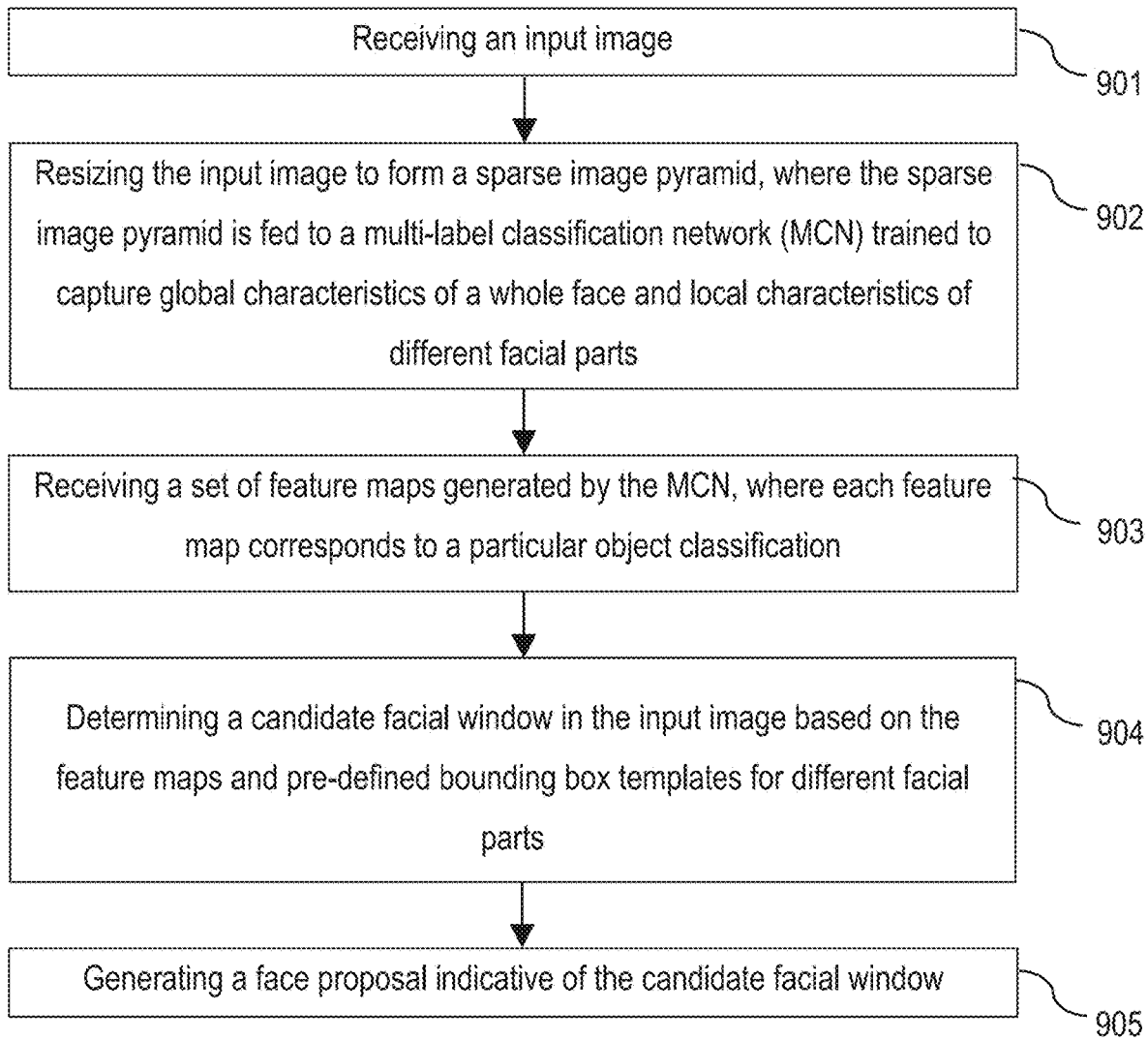
FIG. 11 is a flowchart of an example process for performing fast face detection, in one or more embodiments.

FIG. 11 is a flowchart of an example process 900 for performing fast face detection, in one or more embodiments. Process block 901 includes receiving an input image. Process block 902 resizing the input image to different scales to form a sparse image pyramid, where the sparse image pyramid is fed to a multi-label classification network (MCN) trained to capture global characteristics of a whole face and local characteristics of different facial parts. Process block 903 includes receiving a set of feature maps generated by the MCN, wherein each feature map corresponds to a particular object classification (e.g., background, whole face, or facial part such as eye, nose, whole mouth, left corner of mouth, right corner of mouth, and ear). Process block 904 includes determining a candidate facial window in the input image based on the feature maps and pre-defined bounding box templates for different facial parts. Process block 905 includes generating a proposal indicative of the candidate facial window.

In one embodiment, process blocks 901-905 may be performed by one or more components of the object detection system 300, such as the MCN 320, the image resizing unit 330, and the proposal generation system 340.

Figure 12:
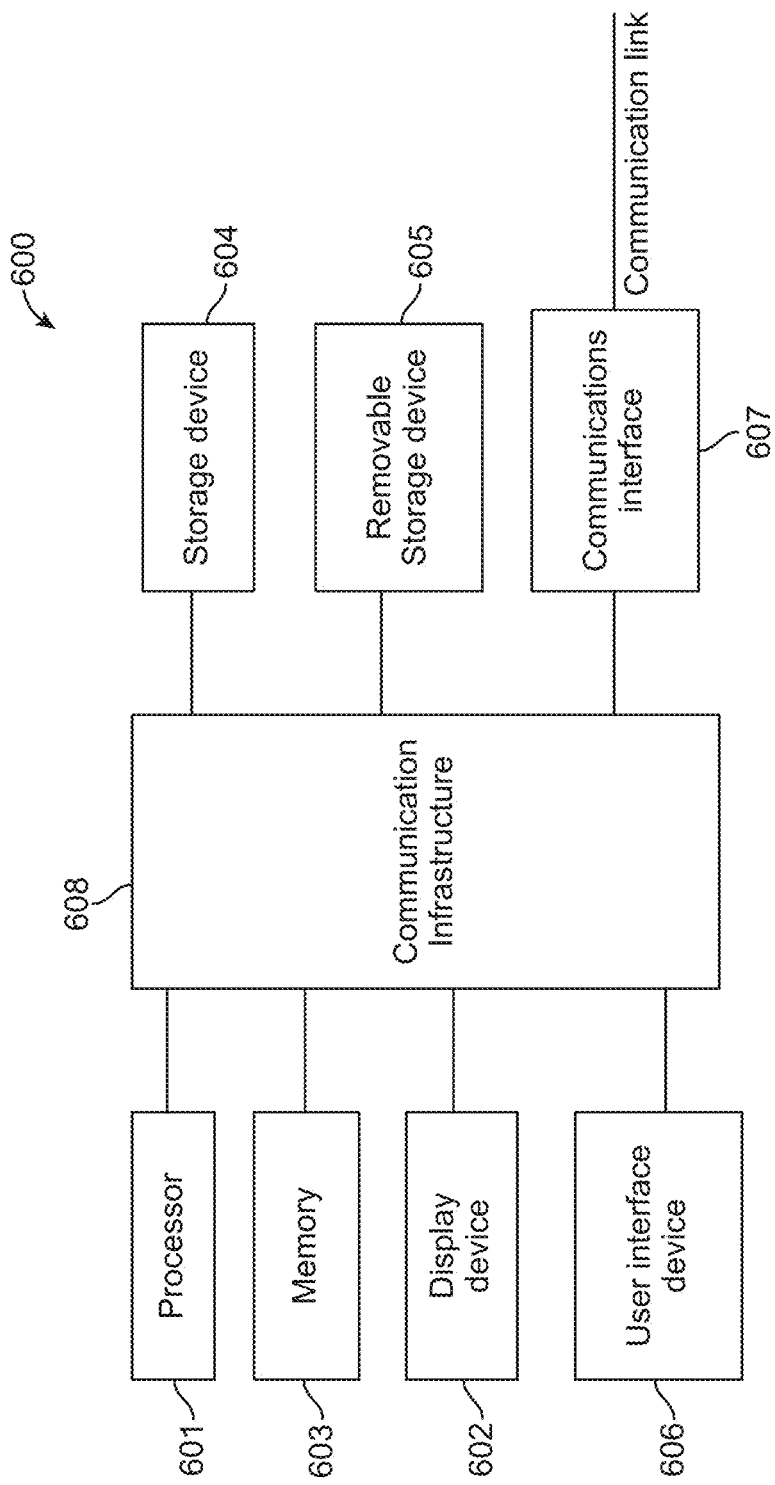
FIG. 12 is a high-level block diagram showing an information processing system comprising a computer system useful for implementing the disclosed embodiments.

FIG. 12 is a high-level block diagram showing an information processing system comprising a computer system 600 useful for implementing the disclosed embodiments. Each system 300, 310, 315, 318 and 350 may be incorporated in a display device or a server device. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 10) and process 900 (FIG. 11) may be stored as program instructions on the memory 603, storage device 604, and/or the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    identifying one or more salient parts of an object in an input image by classifying, at an electronic device, a set of input patches of the input image utilizing a multi-label classification network, wherein the multi-label classification network is trained to capture one or more global characteristics of the object and one or more local characteristics of the one or more salient parts of the object based on input patches cropped from a set of training images, the multi-label classification network classifies at least one input patch of the set of input patches as a first object classification representing a background, and the multi-label classification network classifies one or more other input patches of the set of input patches as one or more additional object classifications representing the one or more salient parts of the object;
    determining an estimated full appearance of the object in the input image based on the one or more salient parts and a relationship between the one or more salient parts and the object as defined by one or more bounding box templates for the one or more salient parts; and
    invoking an action on the electronic device based on the estimated full appearance of the object.

2. The method of claim 1, wherein the identifying the one or more salient parts of the object in the input image further comprises:
    generating a set of feature maps based on a sparse image pyramid; and
    determining a region of interest (RoI) in the input image based on the set of feature maps.

3. The method of claim 2, the method further comprising:
    resizing the input image by generating the sparse image pyramid comprising one or more pyramid levels, wherein each pyramid level corresponds to different scales of the input image.

4. The method of claim 3, wherein the generating the set of feature maps comprises:
    for each input patch of each pyramid level of the sparse image pyramid, classifying the input patch as one of a plurality of object classifications utilizing the multi-label classification network.

5. The method of claim 1, wherein the object is a face, and the one or more salient parts is one or more facial parts of the face.

6. The method of claim 4, wherein the plurality of object classifications comprise the first object classification and the one or more additional object classifications, and at least one of the plurality of object classifications represents at least one of:
    the background, whole face, eye, nose, whole mouth, left corner of mouth, right corner of mouth, or ear.

7. The method of claim 4, further comprising:
    in response to the multi-label classification network capturing a global characteristic of the object in an input patch, determining a location of the object in the input image based on a location of the input patch.

8. The method of claim 4, further comprising:
in response to the multi-label classification network capturing a local characteristic of the one or more salient parts of the object in an input patch, inferring a location of the object in the input image based on a location of the input patch and the relationship between the one or more salient parts and the object as defined by the one or more bounding box templates for the one or more salient parts.

9. The method of claim 1, wherein the action comprises:
in response to a request to capture a picture via a camera coupled to the electronic device:
controlling the capture of the picture based on detecting presence of one or more expected features in the input image utilizing the multi-label classification network, wherein the input image is a camera view of the camera.

10. The method of claim 1, wherein the action comprises:
in response to a request to capture a picture via a camera coupled to the electronic device:
determining a current composition of the picture by detecting a location and a size of each object in the input image, wherein the input image is a camera view of the camera; and
providing one or more suggestions to alter the current composition of the picture based on the current composition.

11. A system comprising:
at least one processor; and
a non-transitory processor-readable memory device storing instructions that when executed by the at least one processor causes the at least one processor to perform operations including:
identifying one or more salient parts of an object in an input image by classifying, at an electronic device, a set of input patches of the input image utilizing a multi-label classification network, wherein the multi-label classification network is trained to capture one or more global characteristics of the object and one or more local characteristics of the one or more salient parts of the object based on input patches cropped from a set of training images, the multi-label classification network classifies at least one input patch of the set of input patches as a first object classification representing a background, and the multi-label classification network classifies one or more other input patches of the set of input patches as one or more additional object classifications representing the one or more salient parts of the object;
determining an estimated full appearance of the object in the input image based on the one or more salient parts and a relationship between the one or more salient parts and the object as defined by one or more bounding box templates for the one or more salient parts; and
invoking an action on the electronic device based on the estimated full appearance of the object.

12. The system of claim 11, wherein the identifying the one or more salient parts of the object in the input image further comprises:
generating a set of feature maps based on a sparse image pyramid; and
determining a region of interest (RoI) in the input image based on the set of feature maps.

13. The system of claim 12, wherein the generating the set of feature maps comprises:
for each input patch of each pyramid level of the sparse image pyramid, classifying the input patch as one of a plurality of object classifications utilizing the multi-label classification network.

14. The system of claim 11, wherein the object is a face, and the one or more salient parts is one or more facial parts of the face.

15. The system of claim 13, wherein the plurality of object classifications comprise the first object classification and the one or more additional object classifications, and at least one of the plurality of object classifications represents at least one of:
the background, whole face, eye, nose, whole mouth, left corner of mouth, right corner of mouth, or ear.

16. The system of claim 13, wherein the operations further comprise:
in response to the multi-label classification network capturing a global characteristic of the object in an input patch, determining a location of the object in the input image based on a location of the input patch; and
in response to the multi-label classification network capturing a local characteristic of the one or more salient parts of the object in the input patch, inferring the location of the object in the input image based on the location of the input patch and the relationship between the one or more salient parts and the object as defined by the one or more bounding box templates for the one or more salient parts.

17. A non-transitory computer readable storage medium including instructions to perform a method comprising:
identifying one or more salient parts of an object in an input image by classifying, at an electronic device, a set of input patches of the input image utilizing a multi-label classification network, wherein the multi-label classification network is trained to capture one or more global characteristics of the object and one or more local characteristics of the one or more salient parts of the object based on input patches cropped from a set of training images, the multi-label classification network classifies at least one input patch of the set of input patches as a first object classification representing a background, and the multi-label classification network classifies one or more other input patches of the set of input patches as one or more additional object classifications representing the one or more salient parts of the object;
determining an estimated full appearance of the object in the input image based on the one or more salient parts and a relationship between the one or more salient parts and the object as defined by one or more bounding box templates for the one or more salient parts; and
invoking an action on the electronic device based on the estimated full appearance of the object.

18. The non-transitory computer readable storage medium of claim 17, wherein the identifying the one or more salient parts of the object in the input image further comprises:
generating a set of feature maps based on a sparse image pyramid; and
determining a region of interest (RoI) in the input image based on the set of feature maps.

* * * * *